United States Patent
Hsu et al.

(10) Patent No.: US 11,279,164 B1
(45) Date of Patent: Mar. 22, 2022

(54) LENGTH-MODULATED SCREENING LINES AND LINE CODES

(71) Applicant: Idemia Identity & Security USA LLC, Billerica, MA (US)

(72) Inventors: Rein-Lien Hsu, Edison, NJ (US); Brian Martin, Sudbury, MA (US); Yecheng Wu, Lexington, MA (US)

(*) Notice: Subject to any disclaimer, the term of this patent is extended or adjusted under 35 U.S.C. 154(b) by 0 days.

(21) Appl. No.: 16/780,183

(22) Filed: Feb. 3, 2020

Related U.S. Application Data

(60) Provisional application No. 62/801,166, filed on Feb. 5, 2019.

(51) Int. Cl.
| | | |
|---|---|---|
| *G06K 9/00* | (2006.01) | |
| *B42D 25/333* | (2014.01) | |
| *G06T 1/00* | (2006.01) | |
| *B42D 25/23* | (2014.01) | |

(52) U.S. Cl.
CPC ........... *B42D 25/333* (2014.10); *B42D 25/23* (2014.10); *G06K 9/00483* (2013.01); *G06T 1/0071* (2013.01)

(58) Field of Classification Search
CPC ......... G06K 19/00; G06K 19/04; G06K 19/06
USPC ................. 235/494, 487, 454, 375
See application file for complete search history.

(56) References Cited

U.S. PATENT DOCUMENTS

| | | | | |
|---|---|---|---|---|
| 10,489,643 B2 | 11/2019 | Bertan et al. | | |
| 2006/0115110 A1* | 6/2006 | Rodriguez | ........... | G07D 7/0053 382/100 |
| 2008/0121728 A1* | 5/2008 | Rodriguez | ............. | B42D 25/29 235/494 |
| 2009/0128858 A1 | 5/2009 | Kiuchi et al. | | |
| 2018/0130108 A1 | 5/2018 | Wu et al. | | |
| 2018/0186164 A1* | 7/2018 | Wu | ................... | G06K 19/06103 |
| 2019/0266749 A1* | 8/2019 | Rhoads | ................... | G06T 5/003 |
| 2019/0311240 A1* | 10/2019 | Wicker | ................ | G06K 19/16 |
| 2020/0210796 A1 | 7/2020 | Hsu | | |

FOREIGN PATENT DOCUMENTS

| | | |
|---|---|---|
| WO | WO2012/159602 | 11/2012 |
| WO | WO2017/091564 | 6/2017 |
| WO | WO2018/089679 | 5/2018 |

OTHER PUBLICATIONS

PCT International Search Report and Written Opinion in International Application No. PCT/US2020/012093, dated Jun. 24, 2020, 20 pages.
PCT Invitation to Pay Additional Fees and Provisional Opinion in International Application No. PCT/US2020/012093, dated Apr. 23, 2020, 14 pages.

* cited by examiner

*Primary Examiner* — Edwyn Labaze
(74) *Attorney, Agent, or Firm* — Adam Lewental; Robert Facey

(57) ABSTRACT

Some implementations provide a computer-assisted method for embedding information in an identification document. The method includes: modulating information by varying lengths of line segments; generating a line code that includes the line segments with corresponding lengths; and applying the line code on an identification document such that the information is used to authenticate the identification document as genuine when a person presents the identification document to verify an identify of the person.

18 Claims, 10 Drawing Sheets

LENGTH-MODULATED SCREENING LINES AND LINE CODES

CROSS-REFERENCE TO RELATED APPLICATIONS

This application claims benefit to U.S. Provisional Application No. 62/801,166, filed Feb. 5, 2019 under 35 USC. 119(e), the entirety of which is incorporated herein by reference.

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

Identifications are provided to customers by issuing authorities such as government agencies or companies during an issuance process. Such identifications include customer information that is used to identify the identity of the customer, and in some instances, provide access or privileges to the customer. However, security features for physical identification cards or digital identifications are often pre-configured during the issuance process and unable to be adjusted after issuance. As a result, such identifications are often susceptible to risk of fraud and counterfeiting when the pre-configured security features become compromised. In addition, besides the use of a unique identification number, many issued identifications often include general security features (e.g., holographic images, pre-configured background patterns) that are applicable to a general population of users that have been issued the same identification.

Implementations of the present disclosure include perceptible curved line codes on physical or digital identification documents. For example, a line code, can be an extension of 1D line codes to 2D, that is used to encode data (e.g., ID holder data). A line code can be configured to have similar traits to watermarks such as easy blending with the background of an identification. Furthermore, a line code may provide additional benefits over 1D line codes and watermarks, such as being rotation and scale invariant.

Particular implementations of the subject matter described in this specification can be implemented so as to realize one or more of the following advantages. Implementations may blend into a curvilinear background of an identification document seamlessly, while still being readily detectable by identification verification systems. For example, a line code may have the appearance of an identification holder's fingerprint and pass unrecognized as a security feature. Implementations may provide robust alignment, rotation, and scaling resistance to the error of card alignment during scanning. For example, a line code may be more easily detectable and decipherable by identification card scanning systems even when the identification is not exactly aligned with a scanning device. For instance, the center point of a line code may serve as an anchor point for detection and decoding algorithms used by identification verification systems. Moreover, line codes may be more graphical and more compact than other types of coding (e.g., one dimensional linear line codes). For example, line codes may fit into more compact regions of identification documents.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
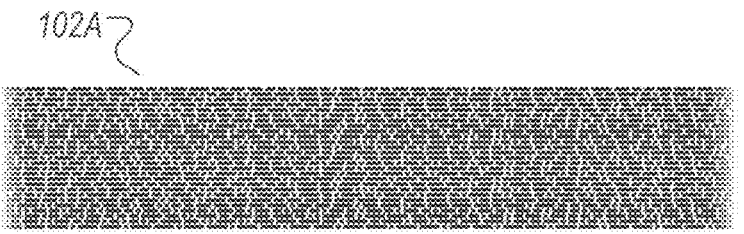
FIG. 1A illustrates an example of various steps of generating line codes including dense and parallel lines that are modulated by the length of segments.
Figure 1A:
Figure 1A:
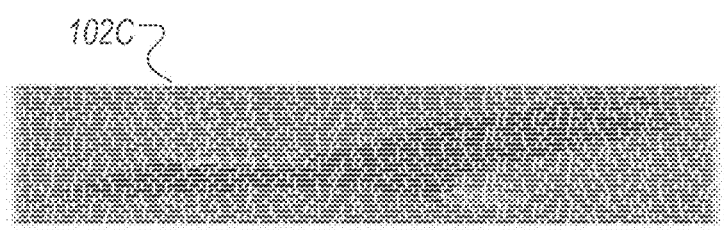

Some implementations automatically generate, detect, and decode a line code via the perceptible line patterns that encode personal information on identification cards to complement the use of imperceptible watermarks for more efficient detection and larger payloads. Instead of painting plain colors on the line patterns, these implementations use the line patterns as a screen of an image so that line patterns appear immersed in the selected image and can disguise themselves. The line code that encodes customer data, e.g., personal information of the identification holder including, but not limited to, ID number (e.g., Driver's license number), date of birth, social security number, or a combination thereof.

These implementations can verify the authenticity of an identification by determining the validity of the secure customer information associated with each line code, verifying the arrangement of the line code within the identification, or both. For instance, once the identification has been issued, the system can detect the embedded line code within the identification in order to identify corresponding secure customer information. The secure customer information can then be used to authenticate the customer. Alternatively or in addition, the system can detect the arrangement of the line code, in order to verify the authenticity of the identification.

For context, security features in watermarked identification cards usually include imperceptible hidden patterns, also known as watermarks, that are almost invisible, hard to detect and easy to break when the card is counterfeited. However, the digital watermarks require a "host" region that is rich in texture to hide the information in an image. In the absence of a proper host region, the watermark signal becomes relatively visible as noisy random patters. The size of texture-rich area usually limits the amount of payloads that digital watermarks can carry on an identification card.

In order to overcome the payload limit, implementations disclosed herein use an alternative security patterns that do not have to be imperceptible. The proposed security patterns are perceptible but can be camouflaged (i) as plain lines among the background line drawings of the card, or (ii) as screening lines over a ghost image. The length of line segments encodes the data of line code that can easily exceed the limit of payloads by adding multiple lines.

For the proposed security patterns, the line code encoded inside lines is capable of error correction. The line code encoded inside each line holds 104 bits, which is slightly larger than (almost the same amount of) information of watermarks can carry—96 bits. The implementations can add multiple lines in order to expand the capacity of the payload without worrying about the perceptibility of line code.

The line code can be rendered either in a single line with full-card width or in multiple split lines within a selected region of interest. With the use of mirroring technique, some implementations can hide the actual starting and ending positions of the line code by repeating line code signals at both ends of lines to make all lines aligned at both side.

Besides rendering line code as line drawings among background lines, some implementations use the line patterns as a screen of an image so that line patterns looks immersed in the selected image and can disguise themselves. Such a screen blending method is one of the blending modes that combines two image layers through the inversion of the multiplication of two inverted layers.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of identification cards.

A customer may opt to enroll into the digital identification program using various methods such as, for example, an online enrollment process, a form submission, or through an oral agreement with an authorized representative. The digital identification administrator may then create a customer entry including customer information in a digital identification database. For instance, the customer information may include one or more of an email address, an identification number, a customer photograph, and other types of demographic information (e.g., home address) associated with the customer. The digital identification database may also indicate to the digital identification administrator that an entry for the customer has been successfully created once the entry for the customer has been created.

The enrollment process for the digital identification program may include the use of various methods to receive customer information, such as, for example, the use of email, the use of a customer token such as a personal identification number (PIN), and/or the use of customer biometric parameters.

Figure 1B:
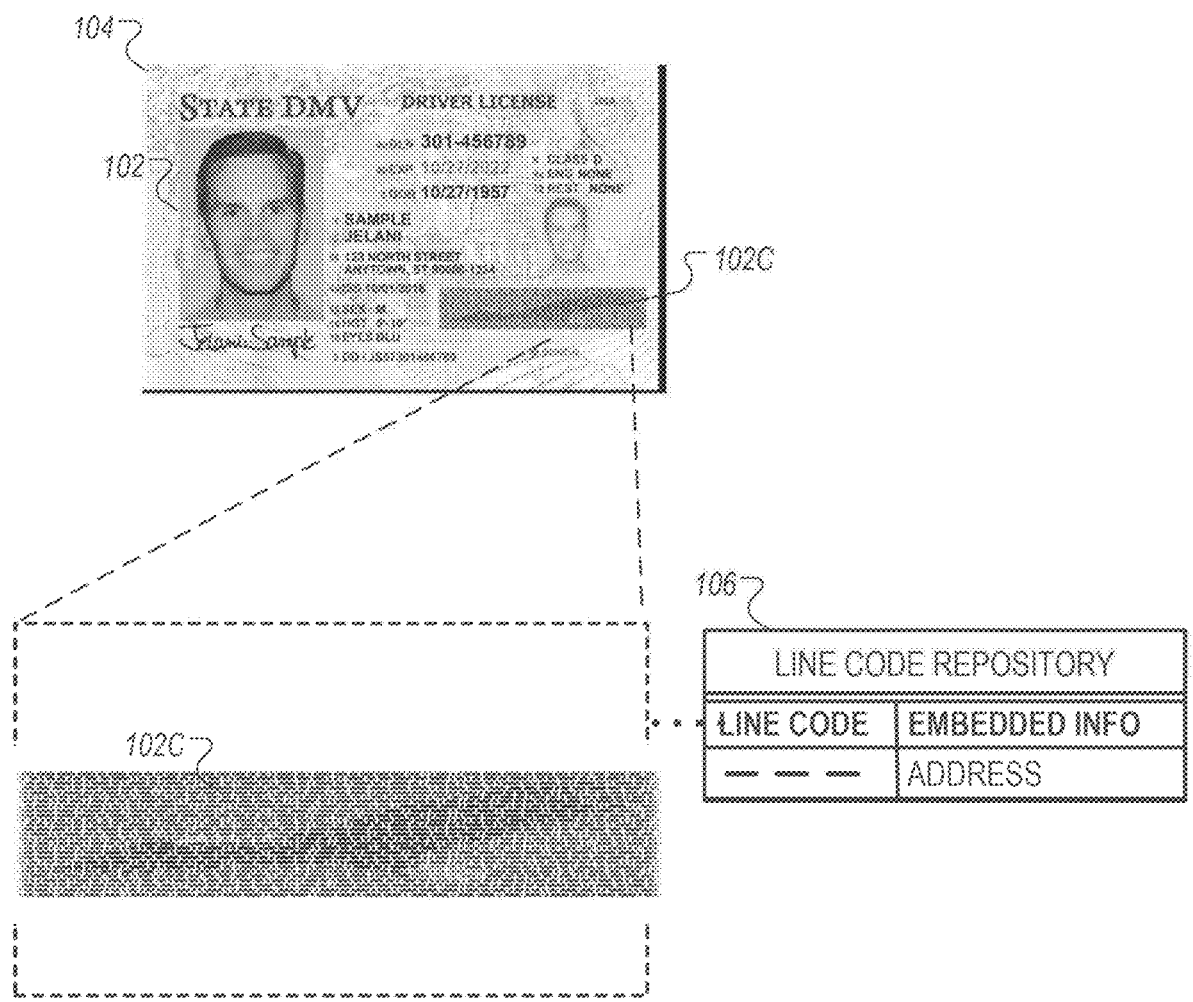
FIG. 1B illustrates an example of an identification document with embedded line codes.

Referring to FIGS. 1A to 1F, some implementations incorporate an automatic system that can encode user data, generate line code, and render line code as line drawing with plain colors or lines within a region of interest to screen an image. FIG. 1A illustrates an example of various steps of generating line codes including dense and parallel lines that are modulated by the length of segments. In the example, pattern 102A shows dense and parallel lines that are modulated by the length of segments (the sequence of segment lengths forms line code) in black and faded at two ends. Photo 102B covers a background pattern (for example, a soaring eagle) before screening. The line code 102A is applied to background pattern 102B as a screen to generate screened pattern 102C. In some implementations, the screened pattern 102C is overlaid on a region of an identification document 104, as illustrated in FIG. 1B. The line code 102A can encode personally identifiable information (PII) from the identification document 104. The encoded data can include, but is not limited to, personal credentials of the card holder, data unique to an issuing authority, or a combination thereof. An example of encoding data is shown in table 105. The line code 102A may also include a URL (universal resource locator) that can be used to connect the document holder to a website server pointed by the URL. The line code 102A may also encode information pointing to the issuing authority of the identification document, such as the name, or the abbreviation. In some implementations, error correction data can be encoded in the line code characteristics. For example, values of the line code orientation can encode parity information for verifying the integrity of data encoded. Alignment technique may be employed to hide the starting and ending signals of line code by mirroring the two ends either cyclically or reversely, and by filling repeated signals to expand line code within the compact region of interest to augment the error tolerance.

In the case of a physical identification document (e.g., an ID card), the line code 102C can be printed or engraved on a layer of the identification document 104. Although, the figure illustrates line codes being embedded within a physical identification, in other instances, the line code 102C can also be embedded within a digital identification (e.g., a digitally issued driver license). In addition, although the example depicted illustrates visibly detectable line code patterns (e.g., visible to a human eye), in other instances, the line code patterns can be constructed small enough to appear invisible to the naked human eye. In such instances, the line code patterns can outline micro-features of the customer photograph 102 (or other portions of the identification document 104).

Figure 1C:
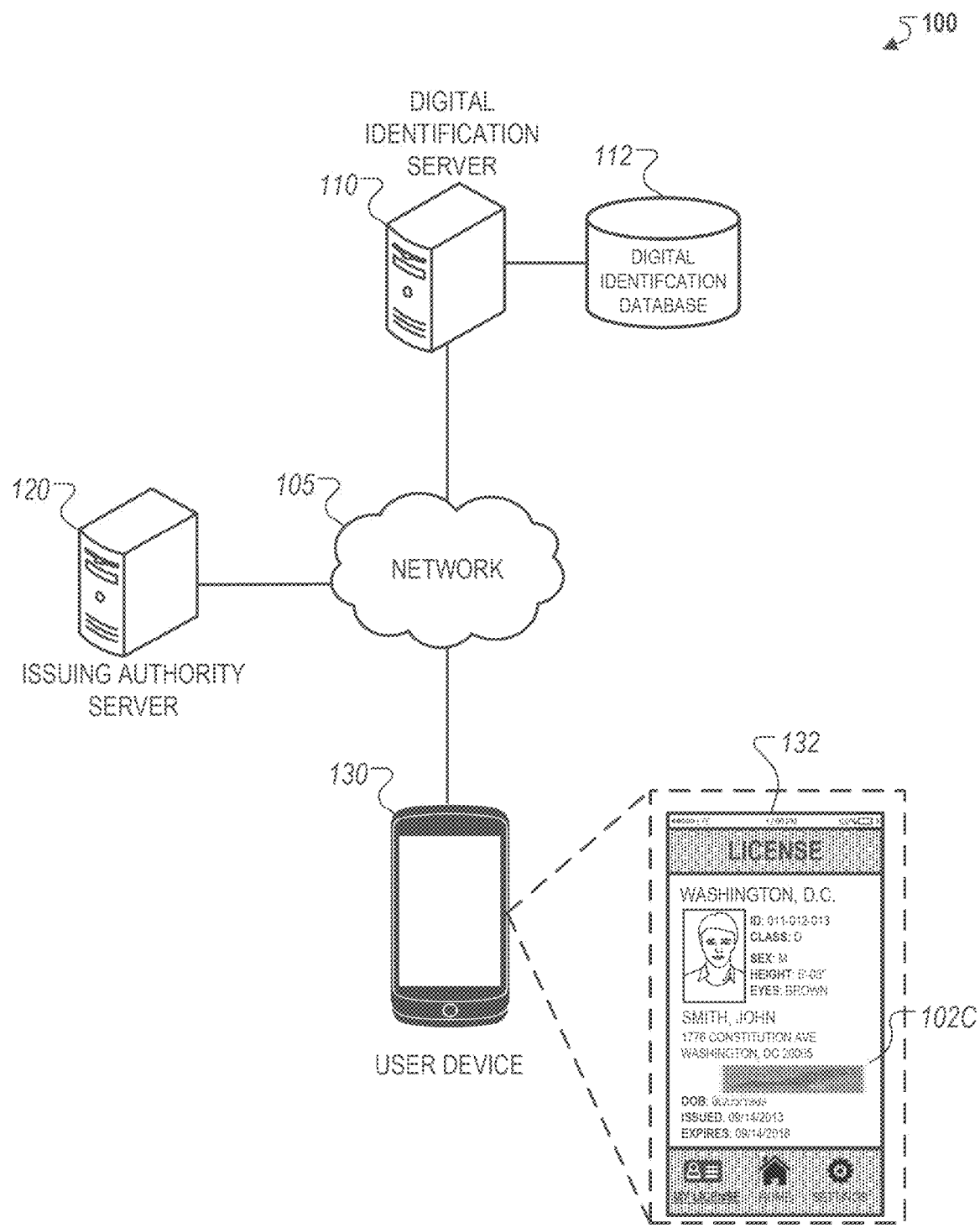
FIG. 1C illustrates an example of a system for generating identification documents with embedded line codes.

FIG. 1C illustrates an example of a system 100 for generating digital identifications that include line codes for encoding data. In general, the system 100 may be used for various processes associated with a digital identification 132 (e.g., line codes as described previously with respect to FIGS. 1A-1B and 1D-1E). In addition, the system 100 may be used to initially enroll customers into a digital identification program, and provision a digital identification 132 to enrolled customers.

Briefly, the system 100 may include a digital identification server 110, an issuing authority server 120, and a customer device 130 connected over a network 105. The digital identification server 110 may also be configured to exchange communications with a digital identification database 112. In addition, the customer device 130 may display a digital identification 132 on a user interface presented to a customer (e.g., a customer or any other authorized user) on the customer device 130. Although the digital identification 132 is depicted as a digital driver license in FIG. 1C, the digital identification 132 may alternatively be a digital form of any physical identification card issued to a customer from various types of identification issuing authorities (e.g., a government agency or a company).

In general, the system 100 can be used to include line code 102C within the digital identification 132 and/or assign portions of secure customer information to each of the line code patterns included within the digital identification 132. As described above, the line code 102C can be included to enable the system 100 to verify the authenticity of an identification presented by a customer and/or authenticate the customer based on extracting assigned credential information for each line segment.

For example, during an issuance process of the digital identification 132, the digital identification server 110 may initially generate one or more line segments to include within the newly generated digital identification 132. The digital identification server 110 may then obtain verified credential information stored within a customer record of the digital identification database 112 and associate portions of the verified credential information with each of the generated line segments. The line segments can be converted to arc segments based on characteristics of a line code pattern. The line code pattern can be segmented to into arc segments that represent the verified credential information. The verified credential information can include data collected and vetted by a government entity (e.g., department of motor vehicles).

Once the digital identification server 110 associates the line code 102C with portions of the verified credential information, the digital identification server 110 may then generate a line code repository 106 and store it within the digital identification database 112. The digital identification server 110 may also generate a new digital identification including designated line segments for issuance. After the digital identification 132 has been issued to the customer, the data included within stored line code repository 106 can be used to identify the line code patterns and/or the line code pattern arrangement that is expected to be included within a verified copy of identification 132.

Additionally or alternatively, information contained within the line code pattern repository can be used to generate time-variant representations of the digital identification 132. For example, the line code pattern repository may specify a time-limited combination of line code patterns included within the digital identification 132 and corresponding credential information for each line code pattern. In such implementations, the line code pattern can be periodically changed by the digital identification server 110 in order to increase the security of the digital identification 132. For example, if a customer transaction includes a digital identification with an expired line code pattern combination (e.g., from a prior configuration), then the digital identifications server 110 may determine that the included digital identification may be a counterfeit identification.

Referring now to the individual components of the system 100, the network 105 may be configured to enable electronic communications between the digital identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 can also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a customer. In some instances, the organization or institution operating the digital identification server 110 may be an organization that is designated by the identification issuing authority to access identification information for a plurality of customers who have been issued a physical identification card. In other instances, the organization or institution operating the digital identification server 110 may be the identification issuing authority (e.g., a government institution) that issues a plurality of customers with a physical identification card.

The digital identification server 110 may coordinate and administer the backend processes that are involved in provisioning a digital identification to the plurality of customers that have been issued a physical identification from the identification issuing authority. For instance, the digital identification server 110 may initiate processes to enroll customers with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure customer information that includes personally identifiable information are not exposed during the provisioning of the digital identification 132.

As described, secure customer information may refer to customer information within the digital identification 132 that may include personally identifiable information associated with the customer such as, for example, social security numbers, place of residence, and/or other demographic information that is associated with other types of information that the customer considers private. In addition, the secure customer information may include medical records of the customer that are protected under the Health Insurance Portability and Accountability Act of 1996 (HIPAA). Access to the secure customer information within the digital identification 132 may be restricted by associated the secure customer information to different line code patterns and specifying the associations within the line code pattern repository as described above.

The digital identification server 110 may exchange communications with the digital identification database 112, which includes customer information for enrolled customers and/or other configuration details related to the digital identification program. For instance, the digital identification database 112 may include a customer entry associated with a customer that includes account information associated with enrolled customers, and any type of customer information that may be provided by the customer during a digital identification enrollment process.

In some implementations, the digital identification database 112 may include customer entries for both customers that are enrolled in the digital identification program and potential customers that the digital identification server 110 has identified as customers that are likely to enroll in the digital identification program. For example, the digital identification database 112 may include a field that indicates whether a customer entry is associated with an enrolled customer or a potential customer. In such implementations, the digital identification database 112 may be accessed by the digital identification server 110 to retrieve customer information for the digital identification 132 associated with an enrolled customer, and customer information for a candidate customer in order to send an enrollment email that provides an enrollment code to the candidate customer.

In some implementations, the customer entry for enrolled customers may be automatically created by the digital identification server 110 within the digital identification database 112. In such implementations, the customer may submit an online enrollment form including a set of user fields for providing customer information. In response, the digital identification server 110 may initiate a computer-implemented procedure that automatically generates a customer entry for the customer in the digital identification database 112 and inserts the values submitted for the set of user fields as customer information that is included in the customer entry.

In some implementations, the digital identification server 110 may additionally exchange communications with an image server, which stores photographs associated with a customer identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure customer information that is included in physical identification cards issued by the issuing authority. For instance, the issuing authority server 120 may provide access to demographic information of customers, historical information associated with customers (e.g., previous identification cards issued, number of renewals, etc.), and/or other types of customer information using authorization procedures that require validation of access credentials. For example, upon receiving a request for the secure customer information by the digital identification server 110, the issuing authority server 120 may require an exchange of the access credentials to validate an authorized request.

The issuing authority server 120 may be queried by the digital identification server 110 for secure customer information during a digital identification operation. For instance, during an enrollment process, after a customer has opted to enroll into a digital identification program, the digital identification server 110 may query the issuing authority server 120 using a customer identifier number to extract secure customer information to be included in a generated digital identification 132. In another example, during a verification operation, the digital identification server 110 may access the issuing authority server 120 to determine whether a digital identification 132 for a customer includes false customer information indicative of a fraudulent digital identification 132.

In some implementations, the issuing authority server 120 may be configured with additional security protocols compared to the digital identification server 110 to protect sensitive customer information associated with the customer. For instance, in some instances, the issuing authority server 120 may be associated with a Federal government agency that manages nationwide programs that require specialized access (e.g., a government clearance). In such instances, the digital identification server 110 may be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the digital identification server 110 determines that a particular digital identification 132 is invalid, a notification may be received by the issuing authority server 120 to take additional security measures to protect more sensitive customer information that may be associated with, but not included in, the digital identification 132. In this regard, the communication exchange between the digital identification server 110 and the issuing authority server 120 may be utilized to ensure protection of customer information beyond the customer information included in the digital identification 132.

The customer device 130 may be a portable electronic computing device that displays the digital identification 132 associated with a customer. For instance, the customer device 130 may be, for example, a smart phone, a tablet computer, a laptop computer, a personal digital assistant device, an electronic pad, a smart watch, a smart glass, or any electronic device with a display that is connected to a network.

The customer device 130 exchanges communications with the digital identification server 110 to receive and transmit enrollment information related to the digital identification program, customer data that is included in the digital identification, credential data used to verify the authenticity of the digital identification 132, and/or configuration settings that adjust the display of the digital identification 132 on the customer device 130. For example, during an online enrollment process, the customer may use the customer device 130 to input customer information and an assigned access code for the digital identification program, which is then transmitted to the digital identification server 110 to generate the digital identification 132. In another example, during a verification process, when the digital identification 132 is enabled on the customer device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the customer device 130 may include a mobile application that exchanges communications to the digital identification server 110 as an application server. For example, the mobile application may be associated with a customer account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the customer device 130. For example, as shown in FIG. 1C, the digital identification 132 may include a photograph of a customer, a customer identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

Figure 1D:
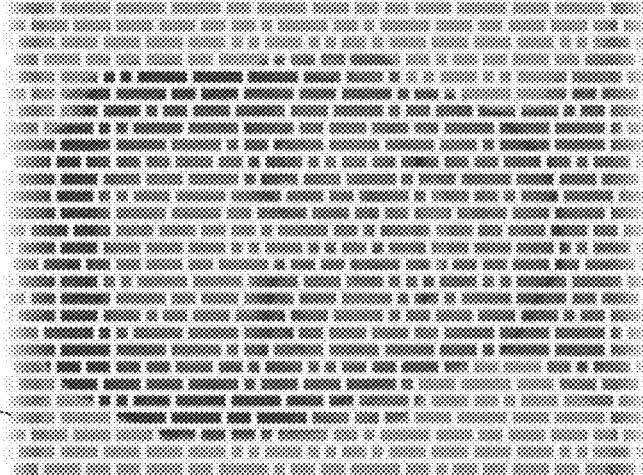
FIG. 1D to 1E illustrates additional examples of embedded line codes as screening lines.
Figure 1D:
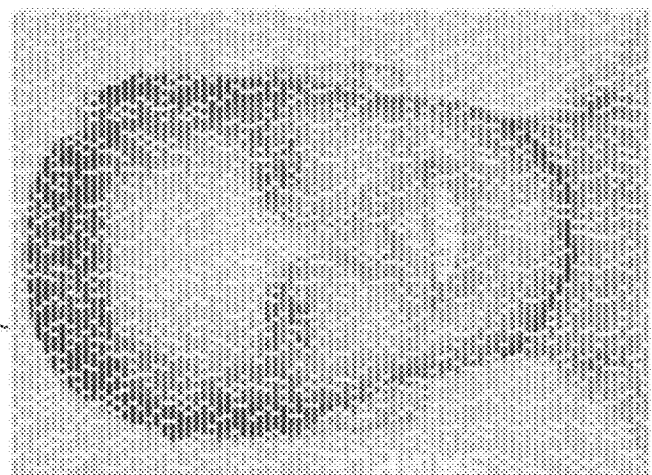
Figure 1E:
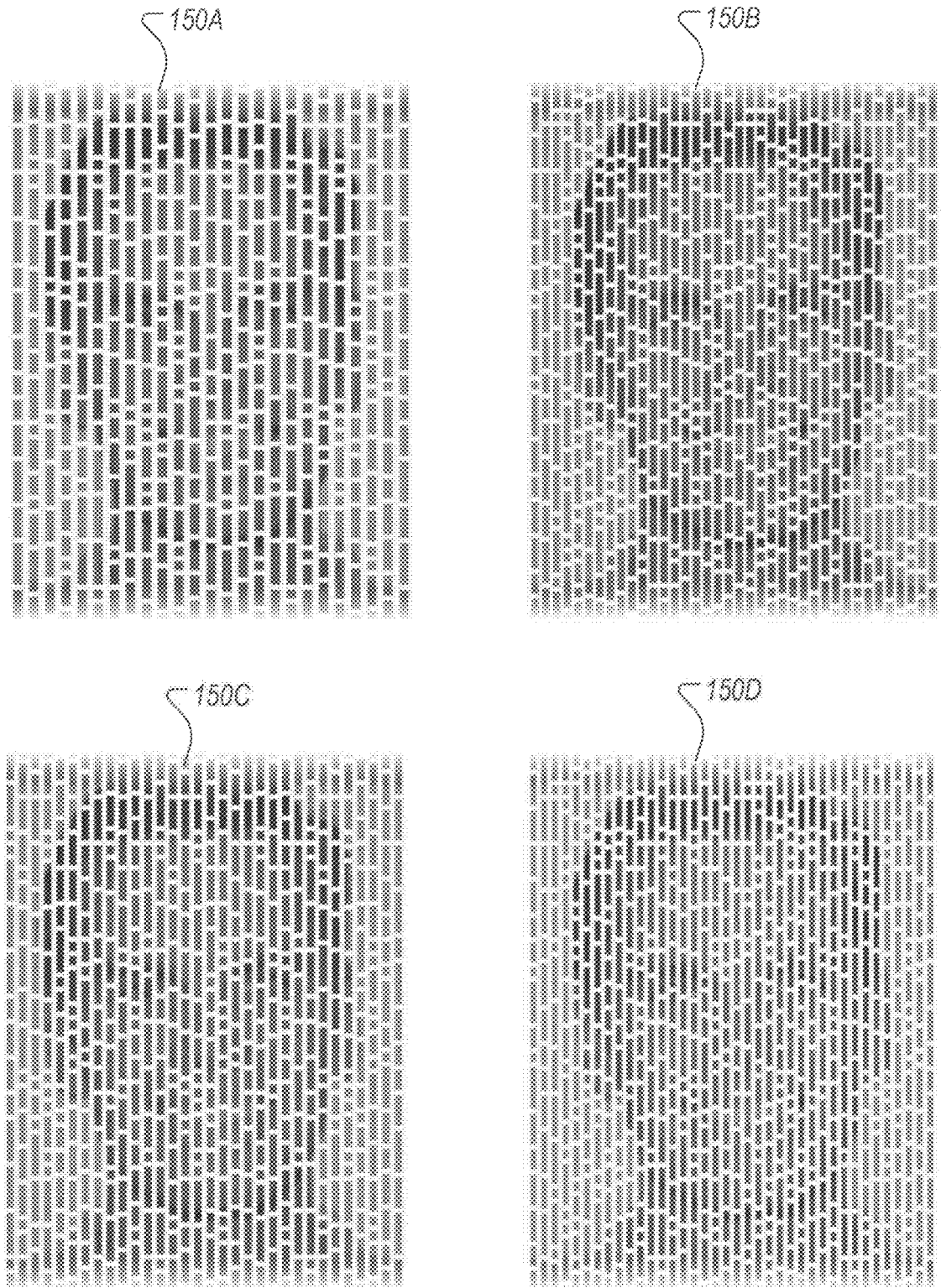
Figure 1F:
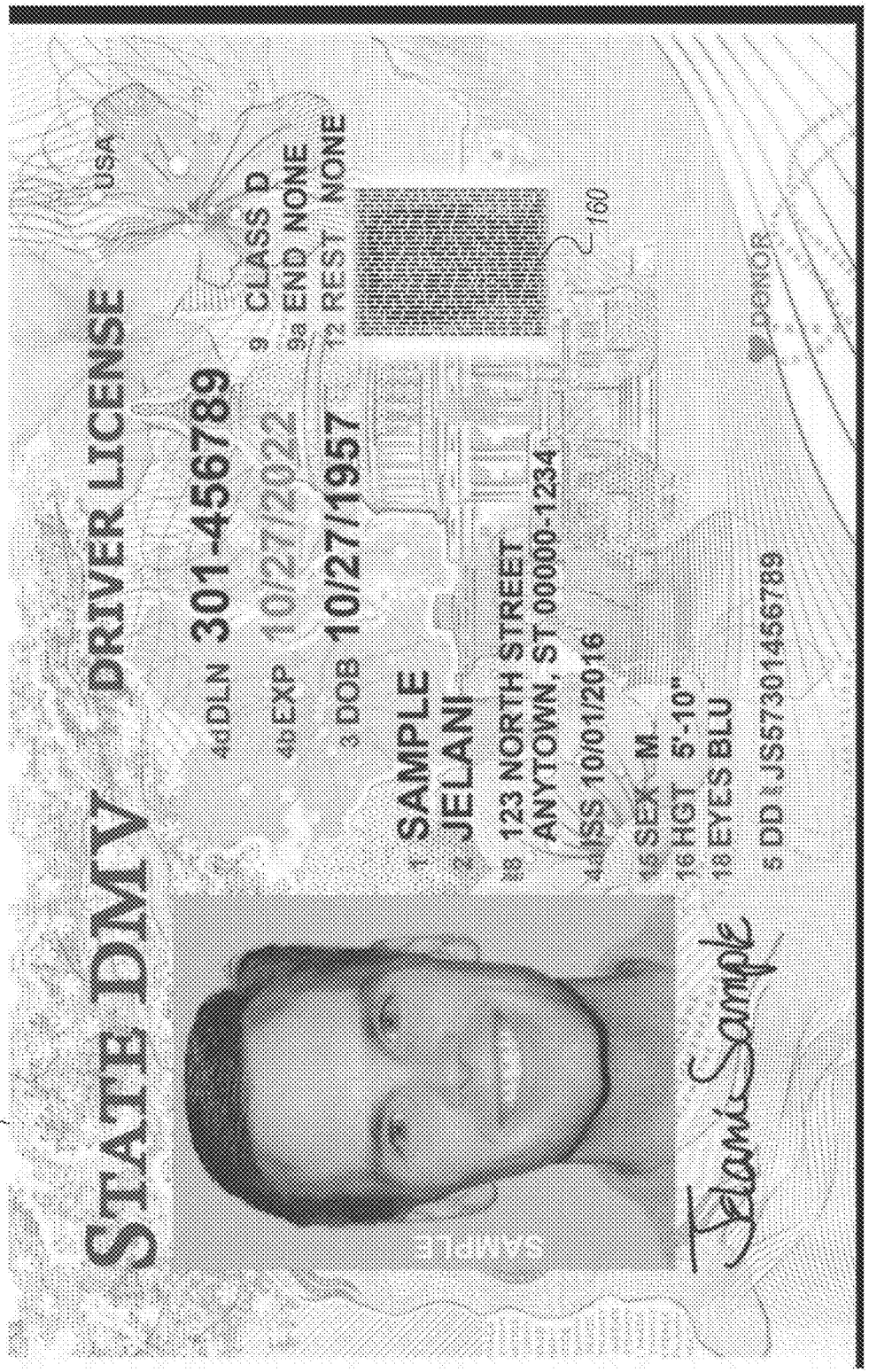
FIG. 1F illustrates another example of an identification document incorporating an example of embedded line codes from FIGS. 1D and 1E.

Further referring to FIGS. 1D to 1F, examples of line codes can be used to screen a facial image pattern. As an illustration, the line codes may be used as a screen of a ghost image. The screening can be done horizontally (as shown in FIG. 1D as 140A) and vertically as shown in FIG. 1D as 140B). Here, 140B shows a rendered facial image using line codes in 28 lines with 5-pixel thickness and 3-pixel line spacing, encoding a total of 24 bytes of information. In the examples shown in FIG. 1E, a line code is used to screen a facial ghost image on an identification document and is rendered with various parameters in line thickness, line spacing, number of lines, number of bytes of encoded information. The rendering is performed within the same region of interest (ROI) on the identification document. Specifically, 150A shows a ghost facial image rendered in 25 lines with 5-pixel thickness and 4-pixel line spacing, encoding a total of 24 bytes. Another example is shown in 1506. The ghost facial image is rendered in 38 lines with 4-pixel thickness and 2-pixel line spacing, encoding a total of 36 bytes. 150C is another example. It shows the same ghost facial image rendered in 32 lines with 4-pixel thickness and 3-pixel line spacing, encoding a total of 24 bytes. 150D shows yet another example where the same ghost facial image is rendered in 38 lines with 3-pixel thickness and 3-pixel line spacing, encoding a total of 36 bytes. FIG. 1F illustrates a holistic identification document 104 with an example of the screened ghost facial image 160, which matches the facial portrait of the person identified by the identification document 104.

Figure 2A:
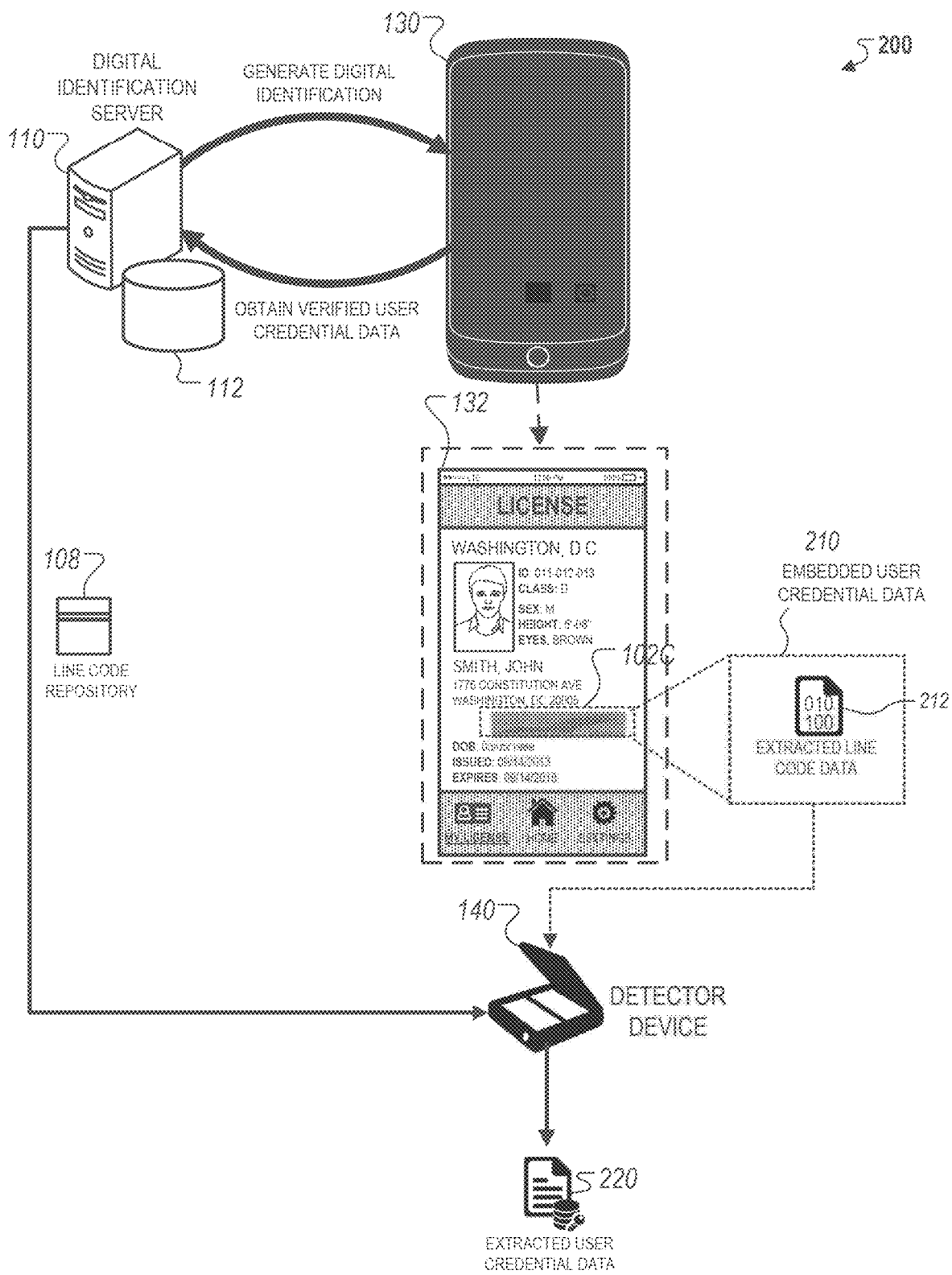
FIG. 2A illustrates an example of a system for verifying a digital identification based on data extracted from embedded line codes of an identification.

FIG. 2A illustrates an example of a system 200 for verifying a digital identification based on data extracted from line code 102C of the digital identification 132. Although FIG. 2A illustrates a system that extracts data from a digital identification, similar systems and techniques can also be employed for a physical identification card such as the identification 102C depicted in FIG. 1A.

The digital identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated line code 102C. Additionally or alternatively, the secure customer information can also be obtained from an electronic database of a verified source such as the issuing authority. For example, during the enrollment process for obtaining a digital driver license, the digital identification server 110 may obtain secure customer information associated with a customer record within the state department of motor vehicle database. In this example, the secure customer information can represent vehicle identification numbers that are currently registered with the customer record, among other types of personally identifiable information.

During a verification operation of the digital identification 132, the detector device 140 initially extracts line code pattern data 212 within the digital identification 132. This can be accomplished using various types of optical recognition techniques. For instance, the detector device 140 can be configured to recognize designated line code patterns that are included within the line code repository 108. For example, the detector device 140 can implement a localization algorithm to identify the line code as rendered on the identification document. Example localization algorithms can include, but are not limited to, Radon transform, finger core detection, a curvature mapping.

During a scan of the digital identification 132, the detector device 140 may identify the presence of the designated line codes, and extract the identified line codes as the extracted line code data 212. The extracted line code data 212 may specify, for example, a list of line codes detected within the digital identifications, and a set of associated information for each detected line code. For example, the line code data 212 may specify characteristics of a particular line code such as a coordinate location within the digital identification of the center point and/or orientation of the particular line code. In these examples, the associated line code characteristics can be used to distinguish between true line code detection and false positive line code detection by the detector device 140, as discussed above.

The detector device 140 can then determine the secure customer information 212 assigned to the extracted line code data 210 using the information specified within the line code repository 108. For example, the detector device 140 can use line code characteristics to measure arc lengths of individual arc segments of a line code 102C. As another example, the detector device 140 can convert the arc segments into line code segments based on the measured arc lengths. The line code segments can be mapped to digital data represented by the length of the line code segments.

As another example, the detector device 140 may cross-reference each of the detected line codes indicated by the extracted line code data 210 with the line codes that are specified within the line code repository 108 in order to determine the pieces of customer information assigned to each line code. As an example, referring back to FIG. 1A, the detection of the line code 102C within the digital identification 132 would enable the detector device 140 to obtain a verified social security number that is stored in the line code repository 108.

As described throughout, the detector device 140 can use both the extracted line code data 210 and the extracted secure customer information 212 to perform various types of verification operations of the digital identification 132. In one example, the detected line code within the extracted line code data 210 can be cross-referenced against a list of verified line code patterns specified by the line code repository 108 in order to determine the authenticity of the digital identification 132. In this example, if the extracted line code data 210 does not include one or more of the verified line codes, then detector device 140 may determine that there is a likelihood that the digital identification 132 is a counterfeit.

In another example, the arrangement of detected line codes within the digital identification 132 can also be cross-referenced against a verified arrangement specified by the line code repository 108. In this example, the detector device 140 may determine that the digital identification 132 may be a counterfeit even if all of the verified line code patterns are detected but in an incorrect arrangement. In each of these examples, the sensitivity of counterfeit detection can be adjusted based on the quality of the digital identification (e.g., image resolution), the scanning and/or recognition capabilities of the detector device, or other aspects that may impact the detection of the line codes. In addition, the sensitivity of counterfeit detection may also be adjusted based on the type of verification operation performed.

In some implementations, the extracted secure customer information 212 can be used to authenticate a customer during an electronic transaction in which the customer provides the digital identification 132 as an authentication document. In such implementations, the extracted secure customer information 212 is used to verify a customer identity associated with the digital identification 132. For instance, because the line codes encode customer information that is not displayed on the digital identification 132, detection of line codes enables the detector device 140 to obtain additional customer information to verify a claimed customer identity of the digital identification 132.

As an example, during an online transaction, a customer provides the digital identification 132 for authenticating a claimed customer identity. In response, the detector device 140 obtains customer information displayed on digital identification 132 to identify the claimed customer identity. The detector device 140 scans the digital identification 132 to extract the line code data 210. The detector device 140 then identifies the secure customer information 212 assigned to the detected line code using the information specified by the line code repository 108. The detector device 140 finally verifies the claimed customer identity based on using the secure customer information 212 to verify the authenticity of the digital identification 132. Subsequent to this verification, the extracted user credential data 220 may be stored.

Figure 2B:
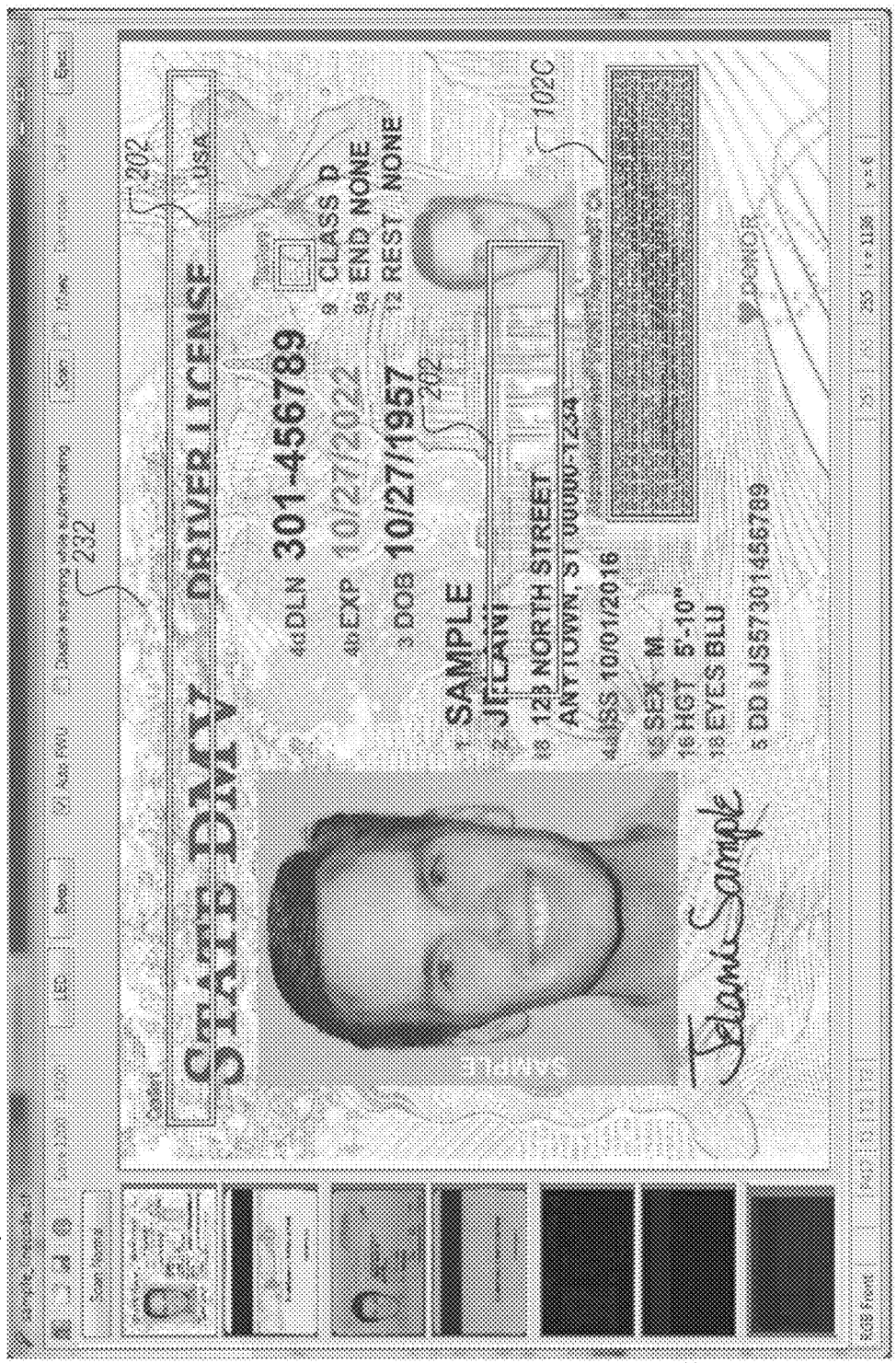
FIG. 2B illustrates an example of a user interface window for verifying an identification document with embedded line codes.

Screening line code into perceptible lines can camouflage the line code as a screen blended image. Further referring to FIG. 2B, the detection module may incorporate a user interface 230, on which an image 232 of an identification document is displayed. The detection module treats image content printed on line area (such as 102C) as plain colors, and detect the line orientation, lengths of line segments in order to decode the hidden line code (such as 202). The line code is decoded as decimal digits and mapped to the original binary data.

In one example, the detection algorithm includes: resizing an input card scan to a working DPI (dots per inch). An illustration is shown in 232. Given an input of rough region of interest (ROI), the algorithm may normalize the region of line code and estimate finer orientation and position of lines. The detection algorithm may then refine the ROI, normalize ROI, and binarize the ROI. Next, the detection algorithm may parse the line segments line by line and rectify the detected line lengths for decoding. At this point, the detection algorithm may decode the line code as decimals (31 digits per line packet) and convert the decimals to binary data (12.5 bytes) as the output. The detection algorithm may seek the fine localization of line code through Radon transform.

While digital watermark may hide unperceivable information, the payload in digital watermarks is quite limited. Depending on digital watermark (DWM) requirements, payloads are in varying sizes—32, 64, and 96 bits have all been commercially used. Some commercial implementations uses payloads of 56 bits and 96 bits. On the other hand, the intelligent mail barcode (IMB) can carry a payload of 31 decimal digits (about 104 bits). The information carried by DWM and standard IMB is very close: DWM uses a max of 96 bits, while the mail barcode uses 65 bars to encode 104 bits (31 decimal digits).

With the use of line code, implementations described in the present disclosure can easily increase the payloads by adding the number of lines printed on the card and painting 4 colors for each line segments to double the amount of payloads. The line code over the small ghost image area can encode 104×3 bits, which is more than three times larger as watermarks can carry.

Further, line codes described in the present application are perceptible but camouflaged as an alternative to watermarks. The line codes are rendered to be perceptible line segments as either (i) plain line drawings among background lines of an ID card, or (ii) a line screen to blend a ghost image.

Some implementations allow multi-line screen to fit into a compact region. Instead of drawing a single long line, these implementations split a single long line code line into multi-line line code for printing within a small region of interest (ROI). Rendering with a compact ROI can achieve small rendering area available on an ID card. Such rendering does not capture a distorted long strip of line code. This feature can facilitate the screening process for blending and camouflaging the line code behind an image.

Figure 3:
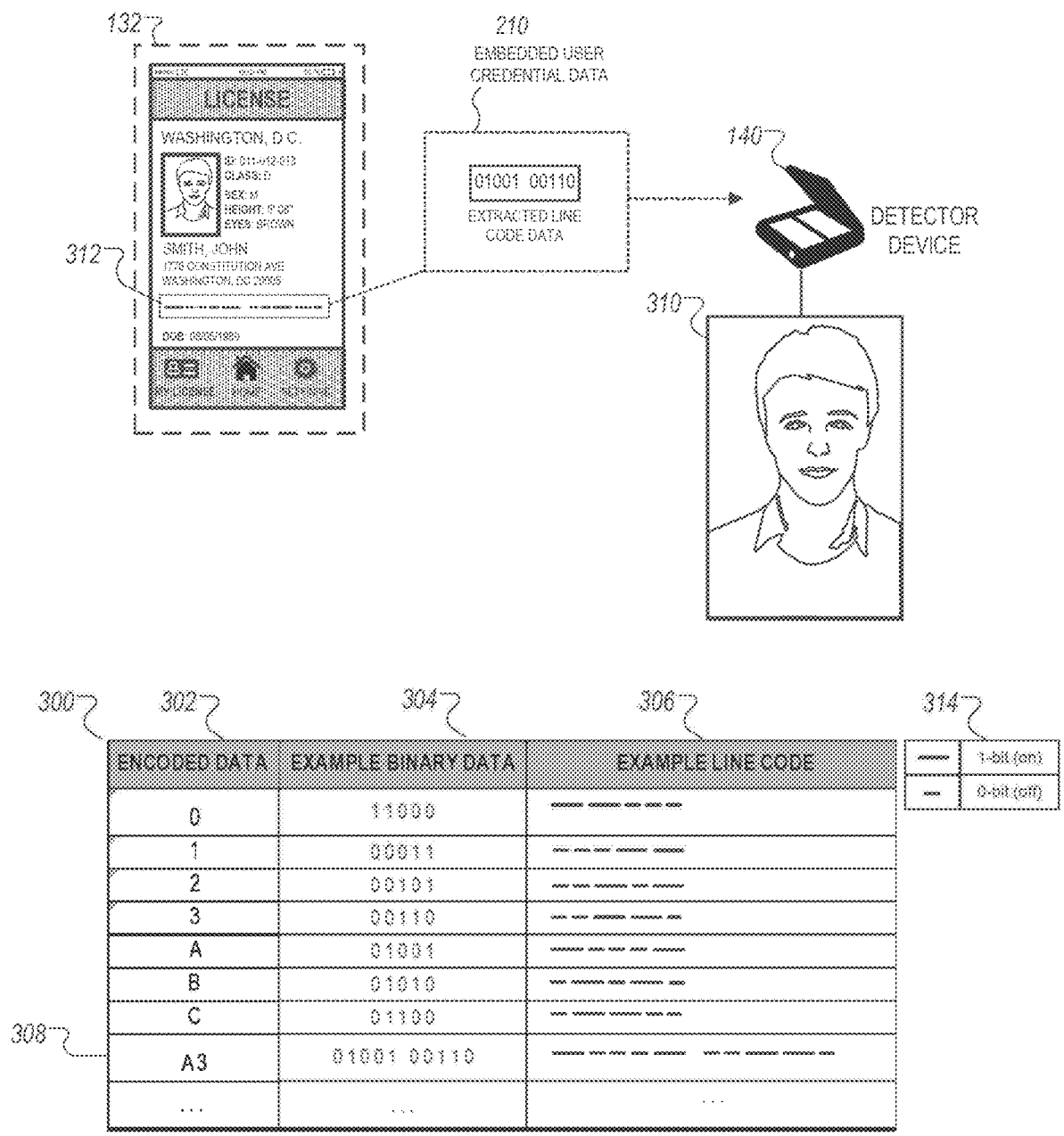
FIG. 3 illustrates an example of a table including examples of encoded line code data viewable by a detector device based on extraction of at least one encoded credential data.

FIG. 3 illustrates a table 300 including example encoded credential data viewable by detector device 140. Table 300 includes encoded data 302, binary data 304, and arc code data 306. The arc code data 306 is illustrated in linear form, e.g., following arc length measurements performed based on a polar coordinate using the characteristics of a given line code. As shown, encoded data 302 is data generally viewable within digital identification 132. Table 300 includes multiple distinct encoded data items that collectively are referred to herein as encoded data 302. Encoded data 302 includes data such as decimal values and alphanumeric values. In some implementations, the decimal values and alphanumeric values can be combined, arranged, or generally used to indicate an individual's name, age, gender, date of birth, address, identification number, and identification class.

In general, table 300 depicts example line code that can be used to encode numerical values and alphabetical characters. In various implementations, the thickness of the lines depicted in the example arc code 306 can vary depending on the type of information being embedded within an example identification. With regard to static lines (non-line code) that are used to create an image/card data depicted on an identification item, the various portions of arc code 306 will not be a part of the lines used to depict card data. Instead example arc code 306 will be embedded as line code 102C within a background pattern of the identification item.

Table 300 includes multiple distinct binary data code sequences that collectively are referred to herein as binary data 304. Binary data 304 includes computer readable code sequences that a processing unit of a computing device can receive and process to extract or obtain encoded data 302. As shown in table 300, unique binary code sequences can correspond to certain encoded data. For example, a binary sequence of "01001" can correspond to the letter "A," thus, various binary sequences can be arranged to indicate the name of the identification card owner. In another example, a binary sequence of "00110" can correspond to the numerical value "3," thus, one or more binary sequences corresponding to numerical values can be arranged to indicate the age of the identification card owner. A particular row 308 corresponds to encoded data "A3," which can be "0100100110" in binary. This row 308 further shows the line code representation of encoded data "A3."

Table 300 includes multiple distinctive line codes that collectively are referred to herein as code data 306. As shown in FIG. 3, legend 314 indicates that longer arc segments correspond to a bit value of "1" while shorter arc segments correspond to a bit value of "0." Moreover, spacing between line segment pairs can vary as well.

As shown in table 300, unique line code data can correspond to certain encoded cardholder data. For example, a line code that includes arc segments of lengths "▄▄ ▄▄ ▄▄▄▄ ▄▄ ▄▄▄▄" (e.g., as converted to linear line segments for readability) can correspond to a decimal value of 2, while a line code pattern that includes arc segments of lengths "▄▄ ▄▄ ▄▄▄ ▄▄▄▄ ▄▄" can correspond to a decimal value of 3. Hence, in some implementations, the aforementioned arc segments can be scanned and decoded to indicate the age (e.g., 23) of the identification card owner. In some implementations, line code patterns shown in FIG. 3 represent only a portion of longer line code patterns that may, for example, extend horizontally from left to right at various sections of digital identification 132 or is corresponding physical card equivalent.

In some implementations, physical or digital identifications can include line code patterns with arc segments that have a thickness of approximately 7.5-micron. In other implementations, arc segment thicknesses can be greater than or less than 7.5-microns. In general, the lengths or spaces between the arc segments can be varied as needed depending, at least in part, on the amount of data that is to be encoded by a particular line code pattern.

In some implementations, line code patterns with arc segments that have an approximate thickness of 7.5-micron can be combined with related sets of offset print lines. The related offset print lines can have a thickness that corresponds to the thickness of the line code patterns (e.g., approximately 7.5-micron) used to encode certain cardholder data. In some instances, offset lines of corresponding thickness can be preprinted in a background image of an example identification.

In some implementations, arc segments used to encode certain sensitive information can be disposed or placed within an identification in an alternating pattern relative to other print lines. Example placement patterns can include every third print line viewable on the identification being composed of line code pattern segments that have a thickness corresponding to, or consistent with, the offset print lines. In alternative implementations, to enhance viewing clarity and improve authentication processes, line code pattern segments can have a slightly larger thickness relative to preprinted background lines. Line code pattern segments can be also be printed or otherwise disposed in the identification using a variety of colors to also aid in enhancing viewing clarity.

As described above, in some implementations, detector device 140 can be configured to scan digital identification 132 and the line code patterns embedded within the digital identification 132 to extract one or more secure user customer information. In FIG. 3, detector device 140 scans digital identification 132 to extract the line code pattern data 210. Detector device 140 may further store biometric information, such as facial portrait 310 scanned from digital identification 132. As shown, digital identification 132 can include an example line code pattern 312 embedded with the digital identification 132 (or a physical card). In some instances, encoded line data can be decoded, in part, by scanning or capturing an image of an example identification (e.g., digital identification 132) with a computing device such as a smartphone, a digital camera, or a laptop computing device.

Figure 4:
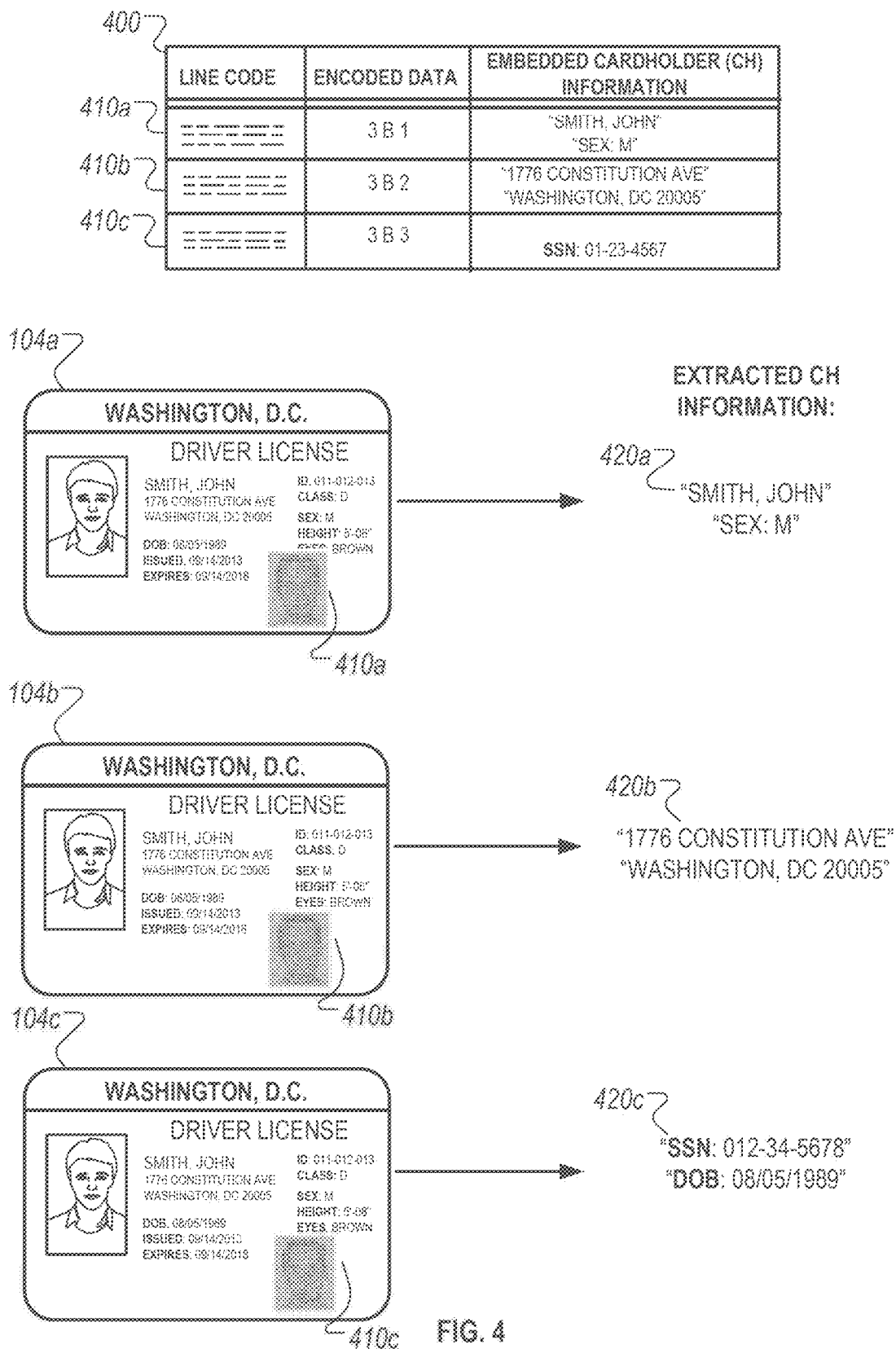
FIG. 4 illustrates examples of decoded credential data that can be extracted from sets of encoded data.

FIG. 4 illustrates example decoded/detected credential data that can be extracted from examples of encoded line code pattern data. FIG. 4 includes table 400, identification documents 104a/b/c (e.g., a card or article), line code pattern features 410a/b/c and extracted data 420a/b/c. In some implementations, line code pattern feature 410a can be extracted using, for example, detector device 140. As indicated above, detector device 140 can include a screen configured to display, to a user, the encoded data that corresponds to line code pattern feature 410a. In one implementation, upon extraction of line code associated with feature 410a, a user of detector device 140 can view, on the display screen of device 140, embedded cardholder information corresponding to, for example, the name and gender/sex of the cardholder. Additionally, embedded cardholder information corresponding to address information and social security number can be displayed by device 140 in response to extraction of line code associated with features 410b and 410c respectively.

As shown in FIG. 3, in one implementation, a detector device 140 can scan identification 102a to extract encoded data 420a associated with line code pattern feature 410a. The extracted encoded data 420a can include the name of the cardholder and the gender of the cardholder. In another implementation, detector device 140 scans identification 102b to extract encoded data associated with line code pattern feature 410b. The extracted encoded data 420b can include the first line of the cardholder's address and the second line of the cardholder's address. In yet another implementation, detector device 140 scans identification 102c to extract encoded data associated with line code pattern feature 410c. The extracted encoded data 420c can include the cardholder's social security number and/or the cardholder's date of birth.

In general, line code patterns embedded within an example physical or digital identification (e.g., card or displayed image on a device) can be formed using a series of lines that create the appearance of a wave going across the face of the identification. For physical cards, ink jet printers, ultra-violet (UV) laser printers, YAG laser printers, or any other suitable print device can be used to produce the embedded line code patterns described in this specification.

In some examples, with regard to physical identification cards, an identification card designer can utilize a YAG laser to embed one or more lines between, for example, the colored or non-colored lines associated with the standard text/print of an identification card. This example card can already include a photograph of the card owner as well as the card owner's demographic information. Embedded line code pattern data would then be included on top of, for example, a pre-printed background information associated with the identification.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

What is claimed is:

1. A method for embedding information in an identification document, the method comprising:
   encoding information by varying lengths of multiple line segments;
   generating a line code that includes the multiple line segments with corresponding lengths;
   generating a line code repository to store data encoding correspondences between the multiple line segments of varying lengths and encoded information; and
   applying the line code on an identification document such that the encoded information is used to authenticate the identification document as genuine when a person presents the identification document to verify an identify of the person.

2. The method of claim 1, wherein applying the line code comprises at least one of:
   applying the line code at a background region of the identification document; or
   applying the line code as a screen of an image region of the identification document.

3. The method of claim 1, wherein the line code encodes at least one of: personally identifiable information from the identification document, information pointing to an issuing authority of the identification document, or a universal resource locator (URL) address.

4. The method of claim 1, wherein generating the line code comprises:
   generating the line code with error correction data.

5. The method of claim 1, wherein generating the line code comprises:
   hiding a starting position or an ending position of the line code by using a mirror technique.

6. The method of claim 1, wherein generating the line code comprises:
   converting the multiple line segments into arc segments for subsequent application to the identification document.

7. A system for embedding information in an identification document, the system comprising a processor configured to perform operations of:
   encoding information by varying lengths of multiple line segments;
   generating a line code that includes the multiple line segments with corresponding lengths;
   generating a line code repository to store data encoding correspondences between the multiple line segments of varying lengths and encoded information; and
   applying the line code on an identification document such that the encoded information is used to authenticate the identification document as genuine when a person presents the identification document to verify an identify of the person.

8. The system of claim 7, wherein causing the line code to be applied comprises at least one of:
causing the line code to be applied at a background region of the identification document; or
causing the line code to be applied as a screen of an image region of the identification document.

9. The system of claim 7, wherein the line code encodes at least one of: personally identifiable information from the identification document, information pointing to an issuing authority of the identification document, or a universal resource locator (URL) address.

10. The system of claim 7, wherein generating the line code comprises:
generating the line code with error correction data.

11. The system of claim 7, wherein generating the line code comprises:
hiding a starting position or an ending position of the line code by using a mirror technique.

12. The system of claim 7, wherein generating the line code comprises:
converting the multiple line segments into arc segments for subsequent application to the identification document.

13. A non-transitory computer-readable medium comprising software instructions that, when executed by a computer processor, cause the computer processor to perform operations of:
encoding information by varying lengths of multiple line segments;
generating a line code that includes the multiple line segments with corresponding lengths;
generating a line code repository to store data encoding correspondences between the multiple line segments of varying lengths and encoded information; and
applying the line code on an identification document such that the encoded information is used to authenticate the identification document as genuine when a person presents the identification document to verify an identify of the person.

14. The non-transitory computer-readable medium of claim 13, wherein causing the line code to be applied comprises at least one of:
causing the line code to be applied at a background region of the identification document; or
causing the line code to be applied as a screen of an image region of the identification document.

15. The non-transitory computer-readable medium of claim 13, wherein the line code encodes at least one of: personally identifiable information from the identification document, information pointing to an issuing authority of the identification document, or a universal resource locator (URL) address.

16. The non-transitory computer-readable medium of claim 13, wherein generating the line code comprises:
generating the line code with error correction data.

17. The non-transitory computer-readable medium of claim 13, wherein generating the line code comprises:
hiding a starting position or an ending position of the line code by using a mirror technique.

18. The non-transitory computer-readable medium of claim 13, wherein generating the line code comprises:
converting the multiple line segments into arc segments for subsequent application to the identification document.

* * * * *